United States Patent
Hsieh et al.

(10) Patent No.: US 10,528,159 B2
(45) Date of Patent: Jan. 7, 2020

(54) INPUT PEN GESTURE-BASED DISPLAY CONTROL

(71) Applicant: HEWLETT-PACKARD DEVELOPMENT COMPANY, L.P., Houston, TX (US)

(72) Inventors: Yi-Kang Hsieh, Taipei (TW); Chung-Chun Chen, Taipei (TW); Han-Kuang Chang, Taipei (TW); Leo Joseph Gerten, Austin, TX (US); Isaac Lagnado, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/076,506

(22) PCT Filed: Jan. 19, 2017

(86) PCT No.: PCT/US2017/014006
§ 371 (c)(1),
(2) Date: Aug. 8, 2018

(87) PCT Pub. No.: WO2018/136057
PCT Pub. Date: Jul. 26, 2018

(65) Prior Publication Data
US 2019/0042006 A1 Feb. 7, 2019

(51) Int. Cl.
*G06F 3/038* (2013.01)
*G06F 3/0346* (2013.01)
(Continued)

(52) U.S. Cl.
CPC .......... *G06F 3/0383* (2013.01); *G06F 3/017* (2013.01); *G06F 3/038* (2013.01); *G06F 3/0346* (2013.01); *G06F 3/03542* (2013.01); *G06F 3/03545* (2013.01); *G06F 3/0485* (2013.01); *G06F 3/04845* (2013.01); *G06F 3/04883* (2013.01); *G06F 2203/0384* (2013.01); *G06F 2203/04806* (2013.01)

(58) Field of Classification Search
CPC .............. G06F 3/03545; G06F 3/0346; G06F 3/03543; G06F 3/03547; G06F 3/0338; G06F 3/0488
See application file for complete search history.

(56) References Cited

U.S. PATENT DOCUMENTS

| 8,624,836 B1 | 1/2014 | Miller et al. |
| 9,256,305 B2 | 2/2016 | Shin |

(Continued)

OTHER PUBLICATIONS

Hinckley et al., "Motion and Context Sensing Techniques for Pen Computing", Microsoft Research, Retrieved from Internet: http://research.microsoft.com/en-us/um/people/benko/publications/2013/Motion-Context-Pen-GI-2013.pdf, Mar. 12, 2013, 8 pages.

*Primary Examiner* — Sanjiv D. Patel
(74) *Attorney, Agent, or Firm* — HPI Patent Department

(57) ABSTRACT

In one example, an input pen to control an operation of a display is described, which may include a sensor to detect an input pen gesture, a communication interface to establish a connection with the display, and a controller to transmit a control signal corresponding to the detected input pen gesture to the display via the communication interface. The control signal may be used to retrieve a gesture command to manipulate data on the display.

15 Claims, 10 Drawing Sheets

(51) Int. Cl.
*G06F 3/0354* (2013.01)
*G06F 3/0484* (2013.01)
*G06F 3/01* (2006.01)
*G06F 3/0485* (2013.01)
*G06F 3/0488* (2013.01)

(56) References Cited

U.S. PATENT DOCUMENTS

| | | | |
|---|---|---|---|
| 9,430,052 | B2 | 8/2016 | Hong et al. |
| 2004/0239702 | A1 | 12/2004 | Kang et al. |
| 2005/0083314 | A1* | 4/2005 | Shalit .................... G06F 1/1626 345/179 |
| 2005/0091297 | A1* | 4/2005 | Sato ...................... G06F 3/0346 708/442 |
| 2005/0216867 | A1* | 9/2005 | Marvit .................. G06F 1/1613 715/863 |
| 2011/0164001 | A1 | 7/2011 | Seo et al. |
| 2011/0285671 | A1 | 11/2011 | Wu et al. |
| 2013/0201162 | A1* | 8/2013 | Cavilia ............... G06F 3/03545 345/179 |
| 2013/0257777 | A1* | 10/2013 | Benko ................ G06F 3/03545 345/173 |
| 2014/0092011 | A1* | 4/2014 | De Foras ............ G06F 3/0346 345/157 |
| 2014/0146021 | A1 | 5/2014 | Trethewey et al. |
| 2014/0152576 | A1 | 6/2014 | Kim et al. |
| 2014/0168275 | A1* | 6/2014 | Suzuki .................... G06F 3/017 345/661 |
| 2016/0334884 | A1* | 11/2016 | Solomon ............... G06F 3/0304 |
| 2018/0129310 | A1* | 5/2018 | Haran ................... G06F 3/0346 |

\* cited by examiner

INPUT PEN GESTURE-BASED DISPLAY CONTROL

BACKGROUND

Electronic devices such as tablets, eReaders, mobile phones, smart phones, personal digital assistants (PDAs), and other such devices are commonly used for providing digital content. Example digital content may be in the form of text, audio and videos files, graphics, animations, images, and the like. Such electronic devices sometimes use or include a touch sensitive display, which is useful for displaying a user interface that allows a user to interact with the digital content. The user may interact with the touch sensitive display using fingers or a stylus/input pen, for example.

BRIEF DESCRIPTION OF THE DRAWINGS

Examples are described in the following detailed description and in reference to the drawings, in which.

DETAILED DESCRIPTION

Figure 1A:
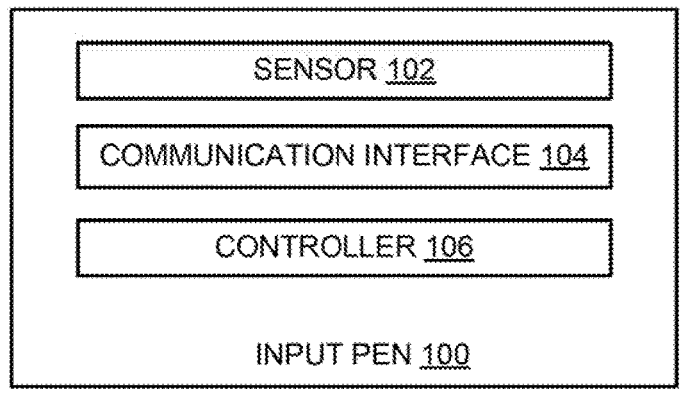
FIG. 1A is a block diagram of an example input pen including components to detect and send input pen gesture to a display.

Users may use an input pen to write or draw on a surface of a touch sensitive display, for example, using a pen tip. A pop up menu may be provided to perform other input operations such as a shifting operation along X-Y plane, zoom in/zoom out operations, rotate operations, and the like. Alternately, a user may perform such input operations by making contact with one position or a plurality of continuous positions on the touch sensitive display using fingers of the user's right or left hand (in particular, index finger and thumb). For example, the zoom out may be a user's operation of touching the touch screen with two fingers simultaneously and then moving the two fingers further apart, and the zoom in may be a user's operation of touching the touch screen with two fingers simultaneously and then moving the two fingers closer together. The user may hold the input pen in hand while performing such input operations on the content. In such cases, the user may find it difficult to perform such input operations while holding the input pen. The term "touch sensitive display" and "touch screen" may be used interchangeably throughout the document.

Examples described herein may provide an electronic device and an input pen detachably connected to the electronic device. The electronic device may include a display, a memory to store a plurality of gesture commands, and a processor. The input pen may include a sensor (e.g., gyro sensor) and a controller. In one example, the sensor may be disposed into a cap of the input pen. During operation, the sensor may detect an input pen gesture. In one example, the sensor may be activated by pressing and holding a trigger (e.g., button) provided on the cap. The input pen gesture may include a movement of the input pen that corresponds with an input operation. Further, the controller may transmit a control signal corresponding to the detected input pen gesture to the electronic device through a data exchange protocol (e.g., a Bluetooth). The sensor may be deactivated and the input pen may be operated in a pen input mode when the trigger is released. In another example, Bluetooth may be enabled when the trigger is pressed and held.

The processor may retrieve a gesture command from the memory based on the control signal to manipulate data on the display. Example data may be text, audio and videos files, graphics, animations, images, and the like. Each gesture command may uniquely correspond to an input pen gesture. The gesture command may include the input operation selected from the group consisting of a shift operation along the x or y axis, a zoom operation, a rotate operation, a multimedia streaming operation, a presentation slide operation, and the like.

For example, retrieving the gesture command may include:

1. retrieving the shift operation along the x or y axis when the input pen gesture is a movement of the input pen along x or y axis by holding the input pen vertically,
2. retrieving the zoom operation when the input pen gesture is a movement of the input pen along a z axis by holding the input pen vertically,
3. retrieving the rotate operation when the input pen gesture is a rotational movement of the input pen when holding the input pen vertically, or
4. retrieving a multimedia streaming operation or a presentation slide operation based on the type of content on the display when the input pen gesture is a movement of the input pen along x, y, or z-axis when holding the input pen horizontally.

Similarly, other content displayed on the display of the electronic device such as graphics, animations, images, for example, can also be controlled based on the input pen gestures. As described below, examples described herein may dispose/add a gyro sensor into a Bluetooth cap of the input pen/stylus based on the original design of the input pen. Examples described herein may use Bluetooth low energy (BLE) as a communication path. Examples described herein may enable BLE cap button press and hold as active mode to save power consumption. Examples described herein may enable to define pen gestures to enhance input pen user experience without conflict with pen tip operations. Examples described herein may apply for presentation mode operations such as changing pages/slides of the presentation to a next or previous one. Examples described herein may also apply for audio/video streaming operations such as play, pause, forward, backward, and the like. Examples described herein may also be applicable for a user interface (UI) and apply customization functions that may be defined and stored in the memory for controlling the UI.

Turning now to the figures, FIG. 1A is a block diagram of an example input pen 100 including components to detect and send input pen gestures to a display. Input pen 100 may be an electronic pen that can defect an input value and transmit the input value to an electronic device. Input pen 100 may include sensor 102, a communication interface 104, and a controller 106.

Figure 2A:
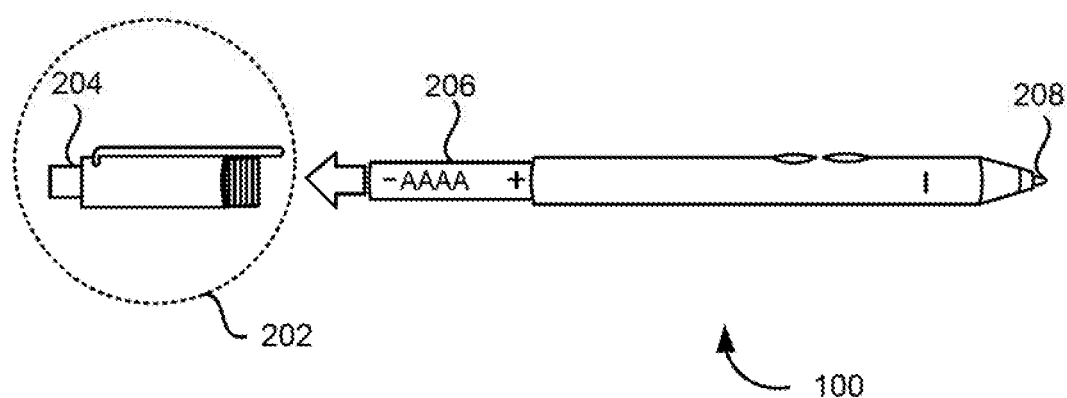
FIG. 2A is a view illustrating an example of an input pen including a pen tip and a cap portion.

During operation, sensor 102 may detect an input pen gesture. In one example, input pen 100 may include a trigger, such as a button 204 as shown in FIG. 2A. Sensor 102 may be activated by pressing and holding the trigger, and sensor 102 may be deactivated and input pen 100 may be operated in a pen input mode when the trigger is released. Example sensor 102 may include an acceleration sensor, a gyro sensor, or a combination thereof. Example gyro sensor may include a 3-axis gyro sensor.

Communication interface 104 may establish a connection with the display. Controller 106 may transmit a control signal corresponding to the detected input pen gesture to the display via communication interface 104. The control signal may be used to retrieve a gesture command corresponding to the input pen gesture to manipulate data on the display. An example operation to retrieve the gesture command corresponding to the input pen gesture is explained in FIG. 1B.

Figure 1B:
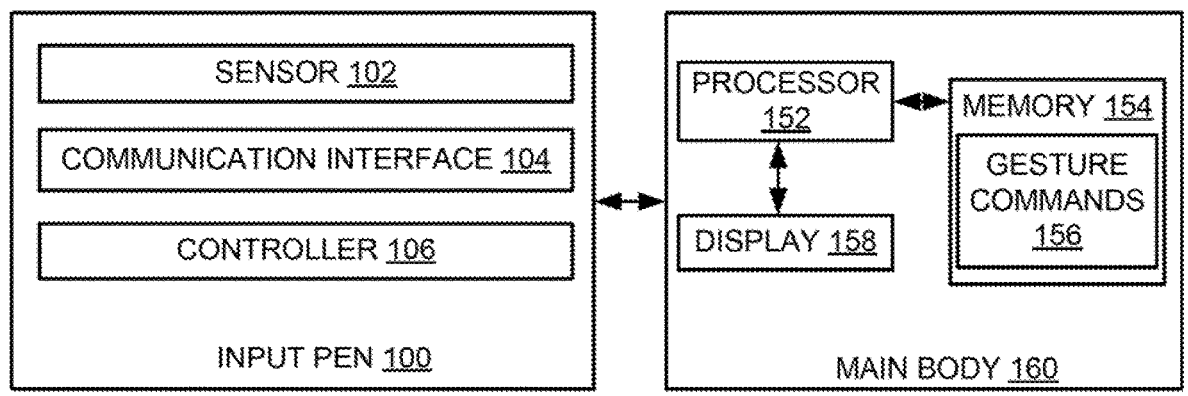
FIG. 1B is a block diagram of an example electronic device and the input pen including components to retrieve a gesture command corresponding to the input pen gesture.

FIG. 1B is a block diagram of an example electronic device 150 to retrieve the gesture command corresponding to the input pen gesture. Example electronic device 150 may include a mobile phone, a laptop computer, a desktop computer, portable personal computer, all-in-one personal computer, a tablet computer, a notebook computer, a game player, or a television.

Figure 2B:
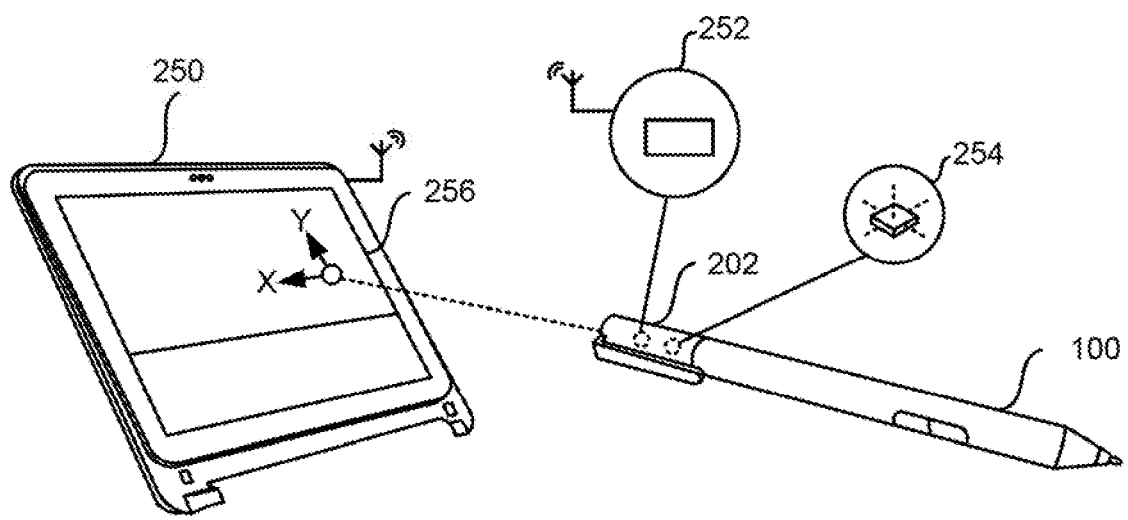
FIG. 2B is a view illustrating an example of the input pen including a sensor disposed in the cap portion.

Electronic device 150 may include a main body 160 and input pen 100 detachably connected with main body 160. For example, input pen 100 may be an electronic pen or stylus that can provide input to electronic device 150 when input pen 100 contacts a display 158 of electronic device 150 in the pen input mode. In some examples, input pen 100 may transmit data to main body 160 of electronic device 150 wirelessly through a Bluetooth interface (i.e., communication interface 104). The Bluetooth interface can enable wireless data transmission between input pen 100 and electronic device 150 using a radio technology, such as a frequency-hopping spread spectrum, among others. Example input pen 100 may include sensor and Bluetooth interface as shown in FIGS. 2A and 2B.

Main body 160 may include display 158, a memory 154 to store a plurality of gesture commands 156, and a processor 152. Example display 158 may include a touch sensitive display, which can display a user interface that allows a user to interact with the digital content. Processor 152 may be communicatively coupled to memory 154 and display 158. Processor 152 may execute stored instructions in memory 154. Memory 154 may be a storage unit to store gesture commands 156 that are defined corresponding to a plurality of input pen gestures. In the example shown in FIG. 1B, memory 154 is shown as a part of electronic device 150, however, memory 154 can also reside in an external storage device, such as a hard disk, a storage card, or a data storage medium and can be accessible by electronic device 150.

During operation, sensor 102 in input pen 100 may detect an input pen gesture. Sensor 102 may detect the input pen gesture upon pressing and holding the trigger. Further, controller 106 may transmit a control signal corresponding to the detected input pen gesture to main body 160. In one example, controller 106 may transmit the control signal corresponding to the detected input pen gesture to main body 160 through a data exchange protocol. Example data exchange protocol may include a Bluetooth.

Each input pen gesture may include a gesture in a horizontal mode or a vertical mode. For example, the gesture in the vertical mode may include a movement of input pen 100 along x, y, or z-axis or rotational movement of input pen 100 when holding input pen 100 vertically. The gesture in the horizontal mode may include movement of input pen 100 along x, y, or z-axis when holding input pen 100 horizontally. The input pen gesture may include a movement of input pen 100 that corresponds with an input operation.

Processor 152 in main body 160 may retrieve a gesture command from the plurality of gesture commands based on the control signal to manipulate data on display 158. Processor 152 may retrieve the gesture command using a gesture recognition program that maps input pen gestures to the gesture commands stored in memory 154. In one example, each of the gesture commands may uniquely correspond to a respective input pen gesture of the plurality of input pen gestures. Each gesture command may include the input operation selected from the group consisting of a shift operation along the x or y axis, a zoom operation, a rotate operation, a multimedia streaming operation, and a presentation elide operation.

In one example, the shift operation along the x or y axis may be retrieved when the input pen gesture includes a movement of input pen 100 along x or y axis by holding input pen 100 vertically. The zoom operation may be retrieved when the input pen gesture includes a movement of input pen 100 along a z axis by holding input pen 100 vertically. The rotate operation may be retrieved when the input pen gesture includes a rotational movement of input pen 100 when holding input pen 100 vertically. Similarly, the multimedia streaming operation or the presentation slide operation may be retrieved based on the type of display data when the input pan gesture includes a movement of input pen 100 along x, y, or z-axis when holding input pen 100 horizontally. The example input operations are explained in detail in FIGS. 3-8.

In one example, the components of electronic device 150 may be implemented in hardware, machine-readable instructions or a combination thereof. In one example, processor 152 may execute stored instructions in memory 154. Processor 152 can be a single core processor, a multi-core processor, a computing cluster, or any number of other configurations. Processor 152 may be implemented as Complex Instruction Set Computer (CISC) or Reduced instruction Set Computer (RISC) processors, x88 instruction set compatible processors, multi-core, or any other microprocessor or central processing unit (CPU), in some examples, processor 152 may include dual-core processor(s), dual-core mobile processors), or the like.

Memory 154 can include random access memory (e.g., SRAM DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. Memory 154 can be used to store computer-readable instructions that, when executed by processor 152, direct processor 152 to perform various operations in accordance with embodiments described herein. For example, the instructions that are executed by processor 152 may be used to implement a method that retrieves gesture commands 156 corresponding to the input pen gestures from memory 154.

FIG. 2A is a view of an example input pen 100 depicting a pen tip 208 and a cap portion 202, FIG. 2B is a view of example input pen 100 depicting a sensor 254 disposed in cap portion 202. In the example shown in FIG. 2B, Bluetooth interface 252 and sensor 254 may be disposed in cap portion 202. Further as shown in FIG. 2A, cap portion 202 may include a trigger (i.e., button 204) to activate/deactivate sensor 254 and Bluetooth interface 252. Further, input pen 100 may include battery 206 to supply power for operating input pen 100. Battery 206 may be coupled to sensor 254. Battery 206 may generate power of the signal emitted by input pen 100. Cap portion 202 may provide a housing for battery 206.

For example, the battery power may be used to activate sensor 254 and Bluetooth interface 252 and to transmit a control signal to electronic device 250 via Bluetooth interface 252. Also, FIG. 2B depicts electronic device 250 including a touch sensitive display 256 in one example, a plurality of gesture commands uniquely corresponding to a plurality of input pen gestures may be defined and stored in electronic device 250. Further, electronic device 250 may include gesture recognition program to map input pen gestures to the gesture commands defined in electronic device 250.

Figure 3A:
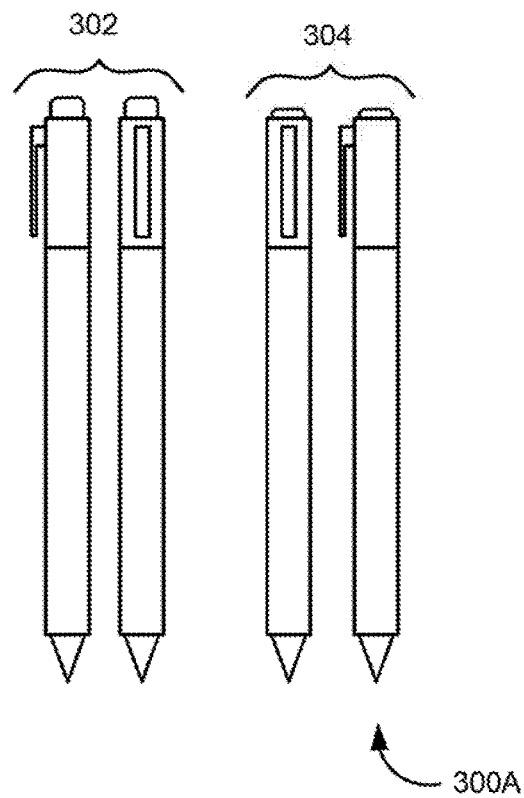
FIG. 3A is a view illustrating an example configuration of the input pen including a trigger to activate/deactivate the sensor.
Figure 3B:
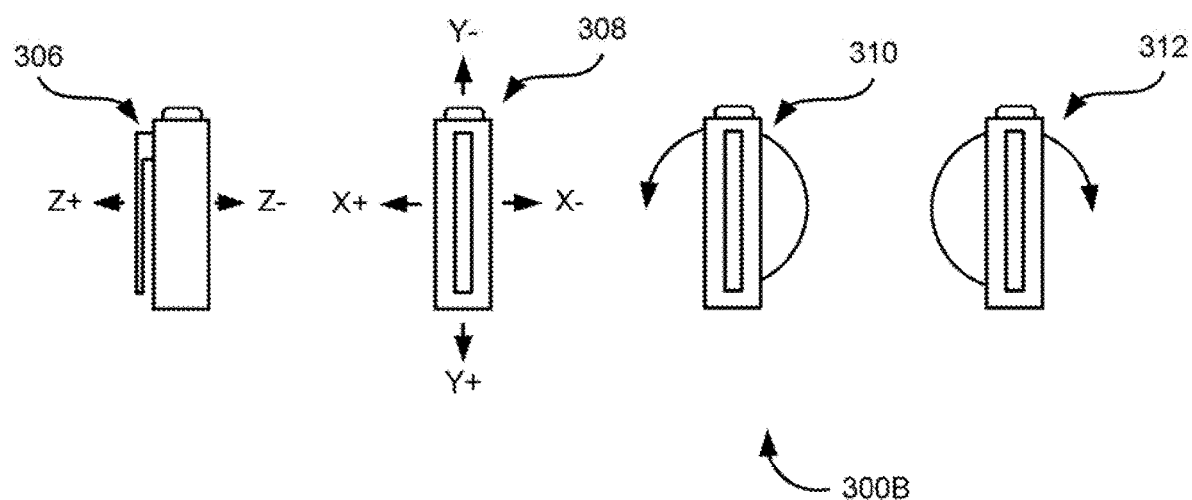
FIG. 3B is a view illustrating an example configuration of the input pen including a 3-axis gyro sensor and corresponding defined motion.

FIG. 3A is a view illustrating an example configuration 300A of an input pen including a trigger to activate/deactivate a sensor. The input pen may be operated in a pen input mode when the trigger of the input pen is released (e.g., 302). The sensor in the input pen may be activated by pressing and holding a button in a cap portion (e.g., 304). FIG. 3B is a view illustrating example configurations 300B of the input pen including a 3-axis gyro sensor and corresponding defined motion. Input pen gestures may include a movement of the input pen along x or y axis (e.g., 308) by holding the input pen vertically, a movement of the input pen along a z axis (e.g., 306) by holding the input pen vertically, and a rotational movement of the input pen (e.g., rotation to right 310 and rotation to left 312) when holding the input pen vertically. Each of the input pen gestures may uniquely corresponds to a gesture command stored in the electronic device as explained in FIGS. 4-8.

Figure 4:
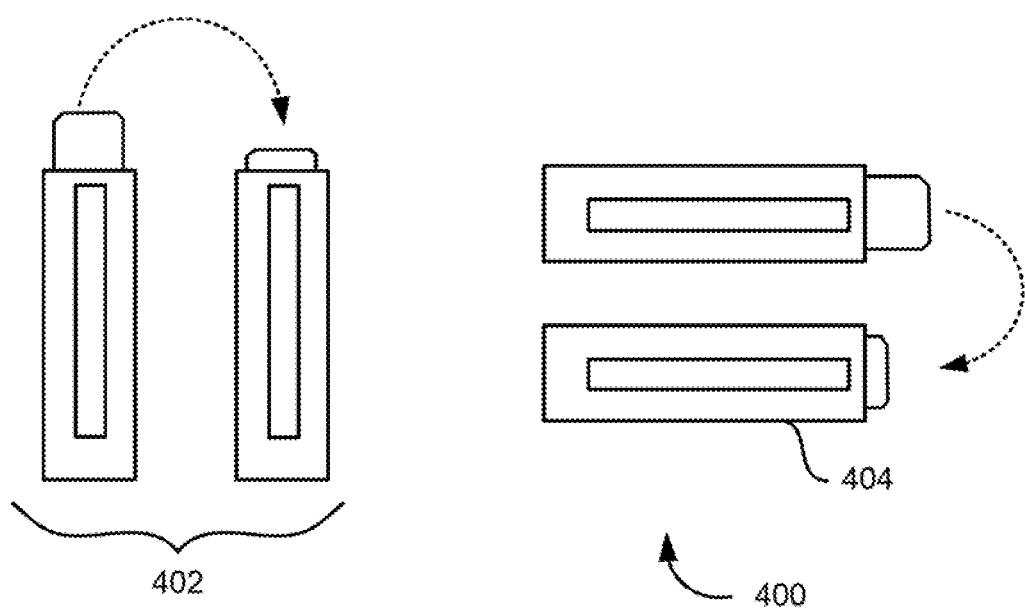
FIG. 4 illustrates an example scenario to operate the input pen in a horizontal mode and a vertical mode.

FIG. 4 illustrates an example scenario 400 to operate the input pen in a horizontal mode and a vertical mode. The input pen gesture may include a gesture in a horizontal mode 404 or a vertical mode 402. During operation, the vertical and horizontal modes may be detected using a gyro sensor chip's compass feature. In one example, the gesture in horizontal mode 404 may be defined by holding the input pen horizontally while the trigger is activated (i.e., button been pressed and hold). For example, the gesture in horizontal mode 404 may be used to perform operations such as a multimedia streaming operations (e.g., play, pause, fast forward, and the like) and a presentation slide operations (e.g., next slide, previous slide, and the like).

In another example, the gesture in vertical mode 402 may be defined by holding the input pen vertically while the trigger is activated (i.e., button been pressed and held). For example, the gesture in vertical mode 402 may be used to perform screen operations such as a shift operation along the x or y axis, a zoom operation, a rotate operation, and the like. An example operation of the input pen gestures and retrieving corresponding mapped gesture commands is explained with respect to FIGS. 5-8.

Figure 5A:
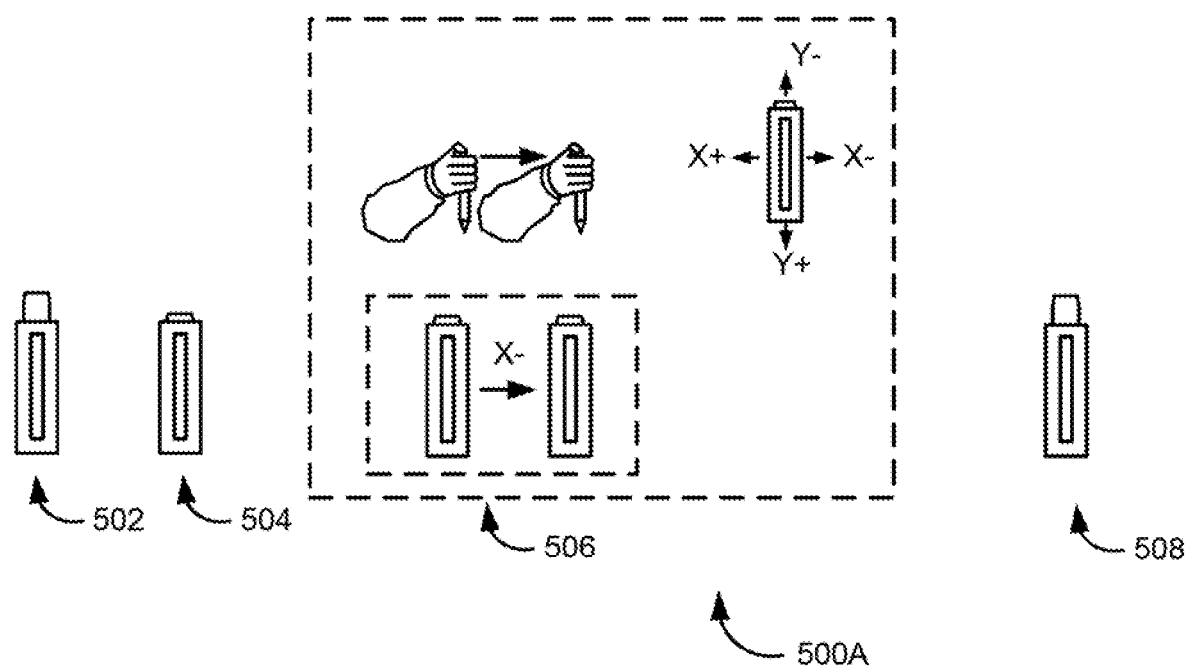
FIG. 5A illustrates an example scenario to perform a shift operation along the x or y axis when an input pen gesture includes a movement of the input pen along x or y axis in the vertical mode.

FIG. 5A illustrates an example scenario 500A to perform a shift operation along the x or y axis when an input pen gesture includes a movement of the input pen along x or y axis in the vertical mode. The input pen may be operated in the pen input mode when the trigger is released (e.g., 502). The sensor may be activated by pressing and holding the button in the cap portion (e.g., 504). The input pen gesture 506 may include a movement of the input pen along x axis (i.e., X−) by holding the input pen vertically. The motion and direction of the input pen may be detected by gyro sensor chip's accelerator feature. The control signal corresponding to the input pen gesture 506 may be transmitted to the display via a communication interface (e.g., Bluetooth). The control signal may retrieve the shift operation along the x axis to shift coordinates of data along the x axis on the display of the electronic device.

Figure 5B:
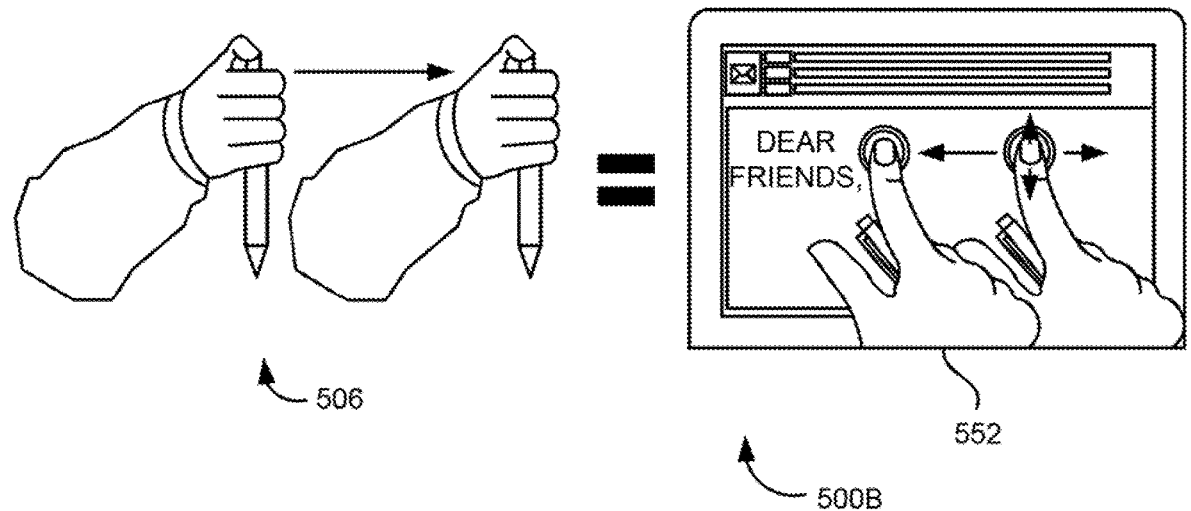
FIG. 5B illustrates an example mapping of the input pen gesture with the shift operation defined in the electronic device.

FIG. 5B illustrates an example mapping 500B of the input pen gesture with the shift operation defined in the electronic device. FIG. 5B depicts an example shift operation 552 that may be mapped to the input pen gesture 506. Upon releasing the trigger (e.g., 508 of FIG. 5A), the sensor can be deactivated and the input pen may be operated in the pen input mode. Similarly, a shift operation along the y axis may be performed to shift coordinates of data along the y axis using an input pen gesture that includes a movement of the input pen along y axis (i.e., Y+ or Y−) by holding the input pen vertically.

Figure 6A:
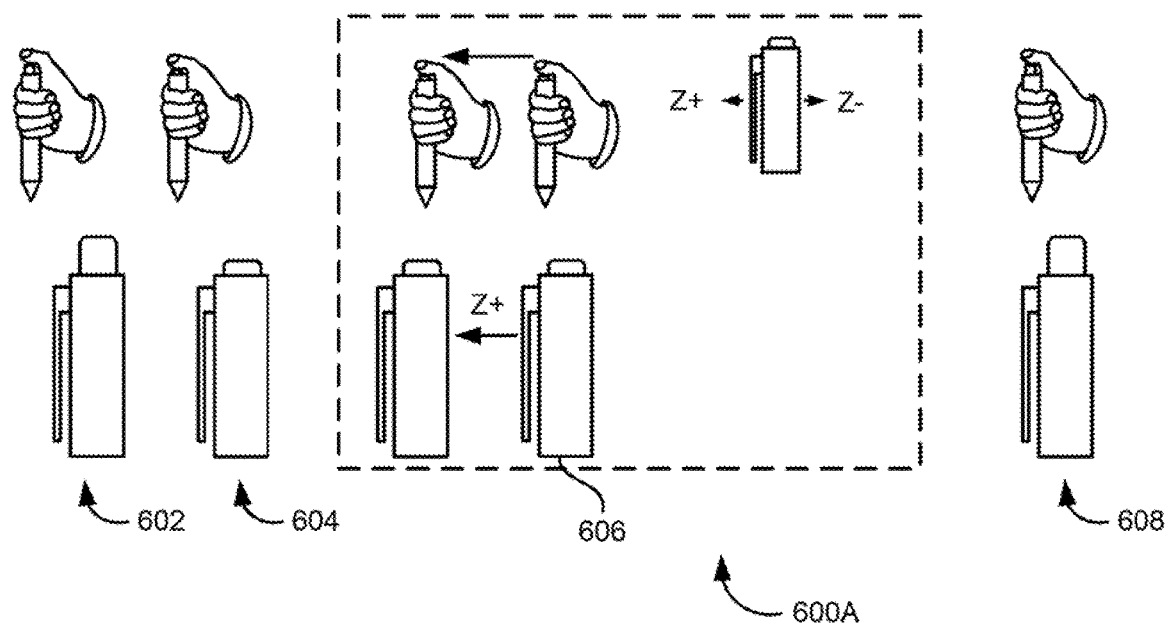
FIG. 6A illustrates an example scenario to perform a zoom operation when the input pen gesture includes a movement of the input pen along a z axis in the vertical mode.

FIG. 6A illustrates an example scenario 600A to perform a zoom operation when the input pen gesture includes a movement of the input pen along a z axis in the vertical mode. The input pen may operate in the pen input mode when the trigger is released (e.g., 602). The sensor may be activated by pressing and holding the button in the cap portion (e.g., 604). The input pen gesture 606 may include a movement of the input pen along z axis (e.g., Z+) by holding the input pen vertically. The motion and direction of the input pen may be detected by gyro sensor chip's accelerator feature. The control signal corresponding to the input pen gesture 606 may be transmitted to the display via a communication interface (e.g., Bluetooth). The control signal may retrieve the zoom operation to zoom in/zoom out data on the display of the electronic device. Upon releasing the trigger (e.g., 608), the sensor can be deactivated and the input pen can be operated in the pen input mode.

Figure 6B:
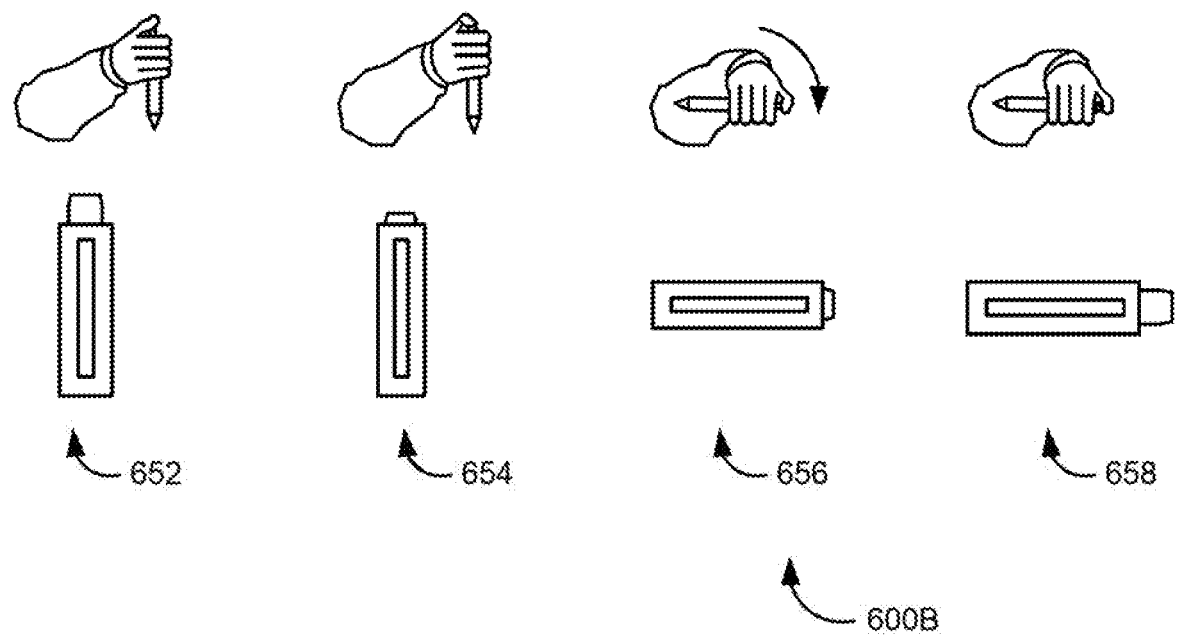
FIGS. 6B and 6C illustrate example scenarios to perform rotation operations when the input pen gesture includes a rotational movement of the input pen in the vertical mode.
Figure 6C:
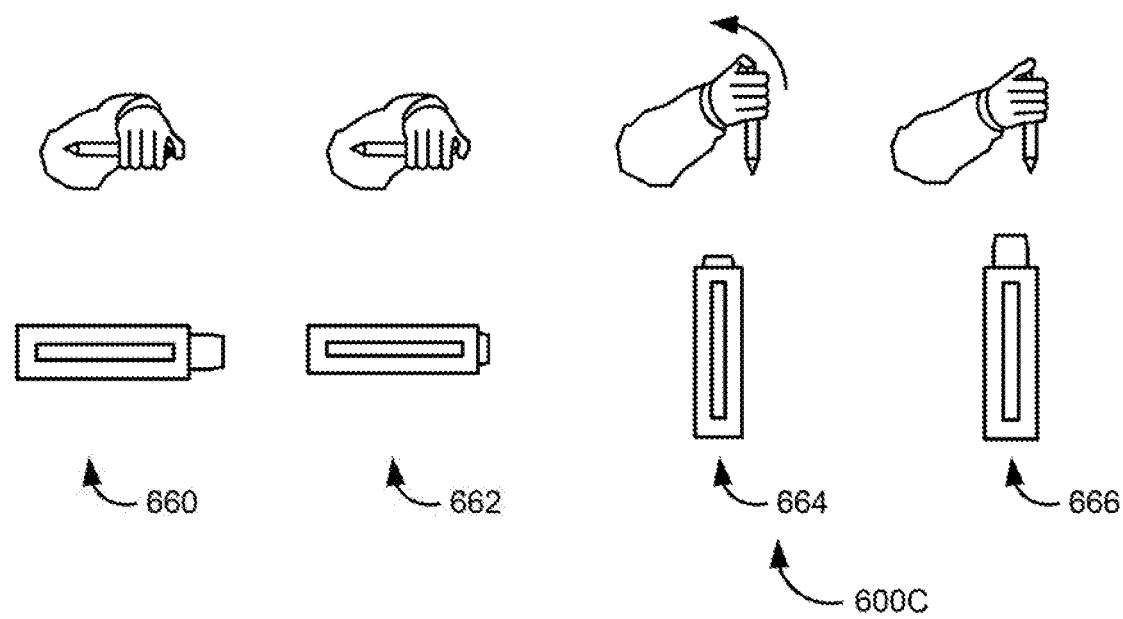

FIGS. 6B and 6C illustrate example scenarios to perform rotation operations when the input pen gesture includes a rotational movement of the input pen in the vertical mode. Particularly, FIG. 6B illustrates a rotate operation 600B to rotate data to left side (i.e., anti-clockwise direction). The input pen may operate in the pen input mode when the trigger is released (e.g., 652). The sensor may be activated by pressing and holding the button in the cap portion (e.g., 654). The input pen gesture (e.g., 656) may include an anti-clockwise rotational movement of the input pen by holding the input pen vertically. The control signal corresponding to the input pen gesture (e.g., 656) may be transmitted to the display via a communication interface (e.g., Bluetooth). The control signal may retrieve the rotate operation to rotate data in anti-clockwise direction (i.e., rotate data to left) on the display of the electronic device. Upon releasing the trigger (e.g., 658), the sensor can be deactivated and the input pen can be operated in the pen input mode.

FIG. 6C illustrates a rotate operation 600C to rotate data to right side (i.e., clockwise direction). The input pen may operate in the pen input mode when the trigger is released (e.g., 660). The sensor may be activated by pressing and holding the button in the cap portion (e.g., 662). The input pen gesture (e.g., 664) may include a clockwise rotational movement of the input pen by holding the input pen vertically/horizontally. The control signal corresponding to the input pen gesture (e.g., 664) may be transmitted to the display via a communication interface (e.g., Bluetooth). The control signal may retrieve the rotate operation to rotate data in clockwise direction (i.e., rotate data to right) on the display of the electronic device. Upon releasing the trigger (e.g., 666), the sensor can be deactivated and the input pen can be operated in the pen input mode.

Figure 7A:
FIGS. 7A-7B and FIGS. 8A-8B illustrate example scenarios to perform presentation slide operations or multimedia streaming operations when the input pen gesture includes a movement of the input pen along x, y, or z-axis in the horizontal mode.
Figure 7B:
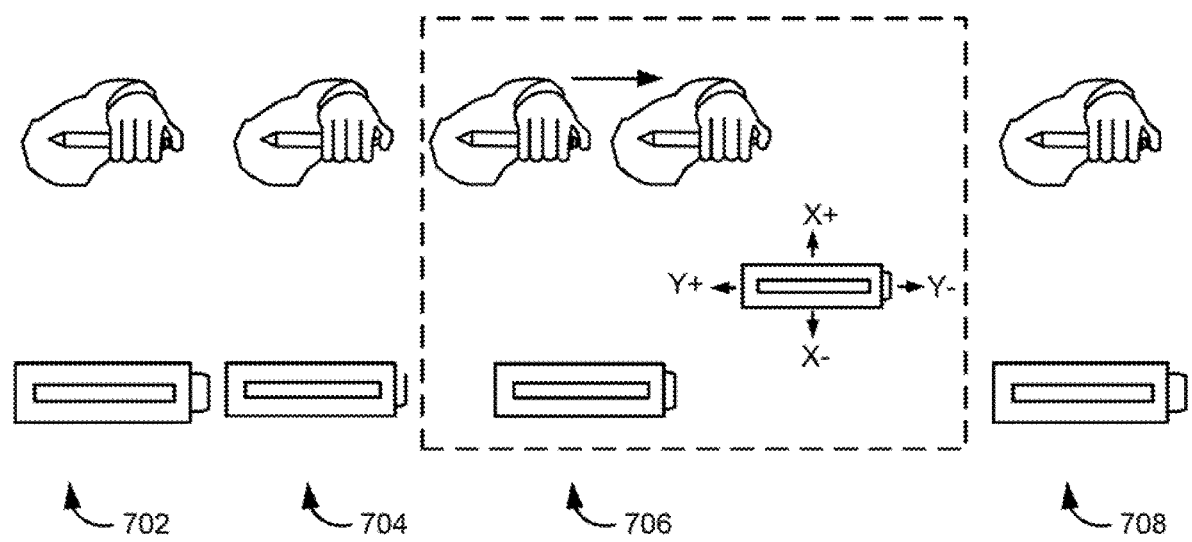

FIGS. 7A-7B and FIGS. 8A-8B illustrate example scenarios to perform presentation slide operations or multimedia streaming operations when the input pen gesture includes a movement of the input pen along x, y, or z-axis in the horizontal mode. Particularly, FIG. 7A illustrates presentation slide control operations 700A when any slide show presentation program (e.g., Microsoft PowerPoint) is displayed on the display device. Example presentation slide control operations may include changing pages/slides of the presentation to a next or previous slide. FIG. 7B illustrates an example scenario 700B to perform a slide control operation when the input pen gesture includes a movement of the input pen along a y axis in the horizontal mode.

In one example, the input pen may operate in the pen input mode when the trigger is released (e.g., 702). The sensor may be activated by pressing and holding the button in the cap portion (e.g., 704). The input pen gesture (e.g., 706) may include a movement of the input pen along y axis (e.g., Y−) by holding the input pen horizontally. The control signal corresponding to the input pen gesture (e.g., 706) may be transmitted to the display via a communication interface (e.g., Bluetooth). The control signal may retrieve a slide control operation to move the presentation to a previous slide on the display of the electronic device. Upon releasing the trigger (e.g., 708), the sensor can be deactivated and the input pen can be operated in the pen input mode.

Similarly, when the input pen gesture includes a movement of the input pen along the Y+ axis by holding the input pen horizontally, then a corresponding slide control operation may be retrieved to move the presentation to a next slide on the display of the electronic device. In another example, multimedia streaming control operations may be performed using the input pen gesture in the horizontal mode when any multimedia program (e.g., video player, audio player, and the like) is rendered on the display device. Example multimedia streaming control operations are explained in FIG. 8A.

Figure 8A:
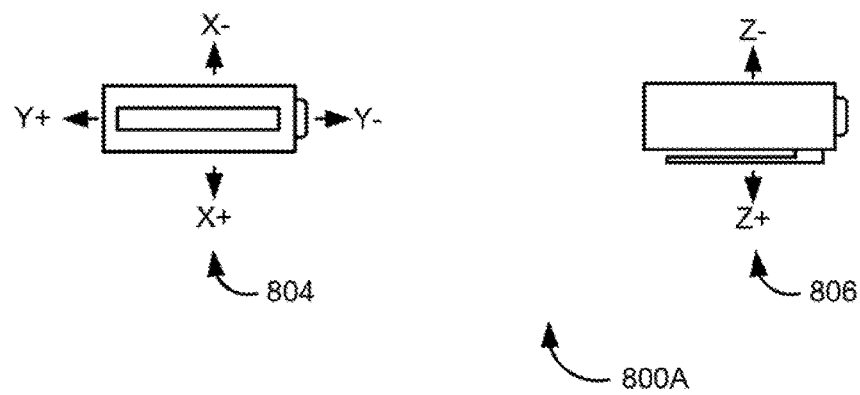
Figure 8B:
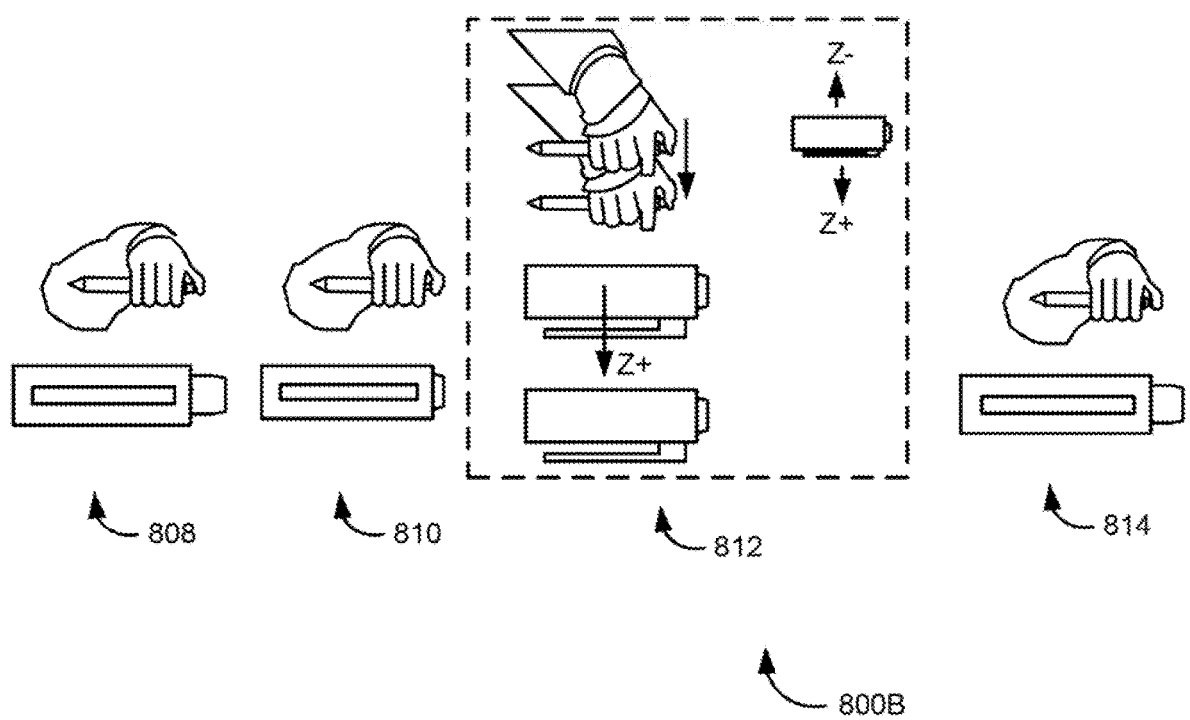

FIG. 8A illustrates multimedia streaming control operations 800A when any multimedia data is rendered on the display device. Example multimedia streaming control operations may include play, pause, forward, backward, fast toward, fast backward and the like. FIG. 8B illustrates an example scenario 800B to perform a multimedia streaming control operation when the input pen gesture includes a movement of the input pen along a z axis in the horizontal mode.

In one example, the input pen may operate in the pen input mode when the trigger is released (e.g., 808). The sensor may be activated by pressing and holding the button in the cap portion (e.g., 810). The input pen gesture (e.g., 812) may include a movement of the input pen along z axis (e.g., Z+ as shown in 806 of FIG. 8A) by holding the input pen horizontally. The control signal corresponding to the input pen gesture (e.g., 812) may be transmitted to the display via a communication interface (e.g., Bluetooth). The control signal may retrieve the multimedia streaming control operation to fast forward the multimedia streaming on the display of the electronic device. Upon releasing the trigger (e.g., 814), the sensor can be deactivated and the input pen can be operated in the pen input mode.

Similarly, other multimedia operations such as play, pause, forward, backward, and fast backward may be performed/mapped when the input pen gesture includes a movement of the input pen along the X+, X−, Y+, Y−, and Z− axis (e.g., as shown in 804 and 806 of FIG. 8A) by holding the input pen horizontally. FIGS. 5-8 describe one way of mapping the gesture commands to the input pen gestures, however, the gesture commands may be uniquely mapped to the input pen gestures in a variety of ways.

Figure 9:
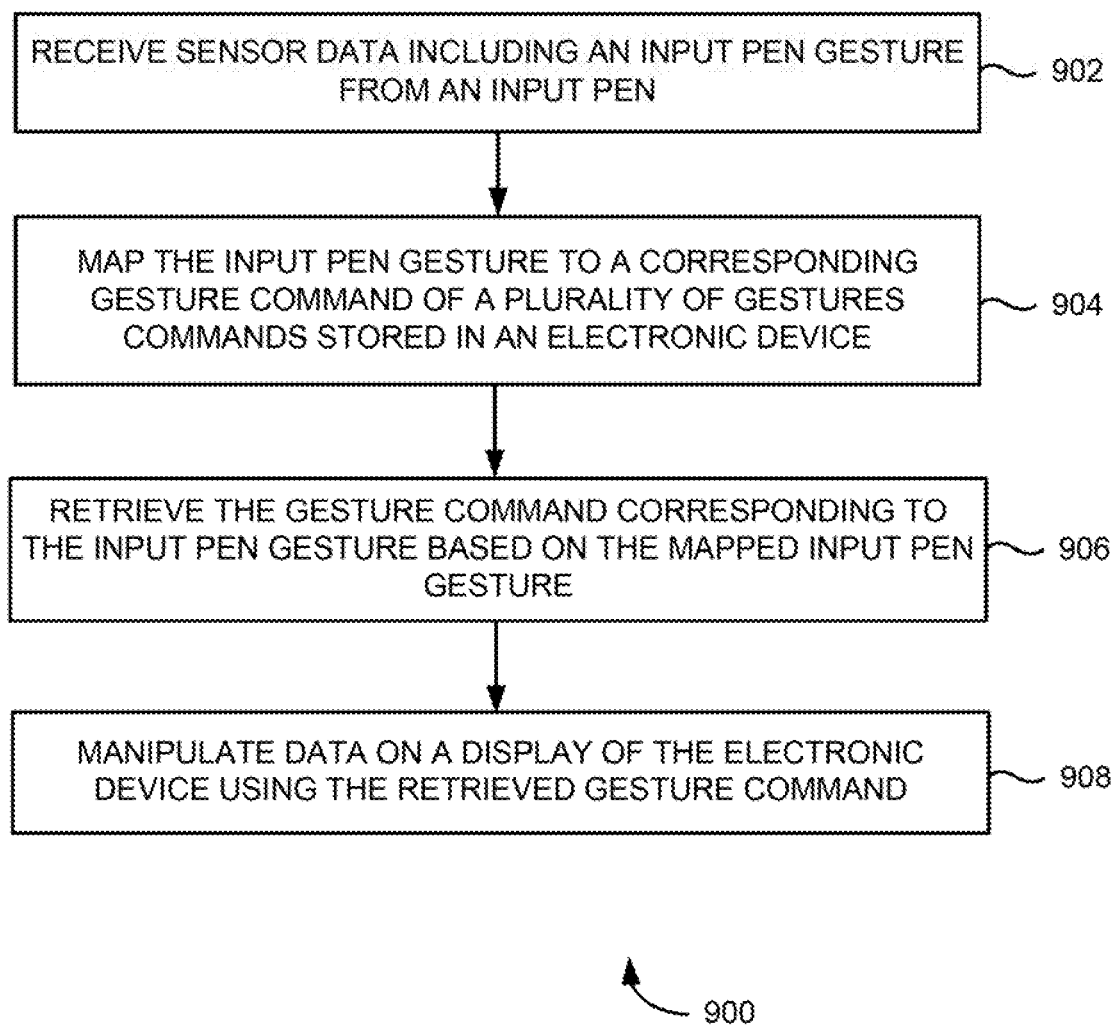
FIG. 9 is an example flow chart of a method to manipulate data on a display of an electronic device using input pen gestures.

FIG. 9 is an example flow chart 900 of a method to manipulate data on a display of an electronic device using input pen gestures. At 902, sensor data including an input pen gesture may be received from an input pen. In one example, the sensor may be activated to detect the input pen gesture by pressing and holding a trigger provided in the input pen. Further, the sensor can be deactivated and the input pen can be operated in a pen input mode when the trigger is released. Sensor data may be detected using sensor, such as an acceleration sensor, gyre-sensor, a compass, or a combination thereof.

For example, mapping information may be stored in a memory of the electronic device. Example mapping information may include a plurality of gesture commands that are uniquely mapped to a plurality of input pen gestures. At 904, the input pen gesture may be mapped to a corresponding gesture command of the plurality of gestures commands stored in an electronic device. In one example, the input pen gesture may be mapped to the corresponding gesture command of the plurality of gestures commands based on the mapping information.

At 906, the gesture command corresponding to the input pen gesture may be retrieved based on the mapped input pen gesture. In one example, the gesture command corresponding to the input pen gesture may be retrieved from the memory based on the mapping information. For example, retrieving the gesture command corresponding to the input pen gesture may include:

1. retrieving a shift operation along the x or y axis when the input pen gesture comprises a movement of the input pen along x or y axis by holding the input pen vertically,
2. retrieving a zoom operation when the input pen gesture comprises a movement of the input pen along a z axis by holding the input pen vertically,
3. retrieving a rotate operation when the input pen gesture comprises a rotational movement of the input pen when holding the input pen vertically, or
4. retrieving a multimedia streaming operation or a presentation slide operation when the input pen gesture comprises a movement of the input pen along x, y, or z-axis when holding the input pen horizontally.

At 908, data may be manipulated on the display of the electronic device using the retrieved gesture command. For example, data may be rotated in clock wise/anti-clockwise direction on the display based the retrieved gesture command.

Figure 10:
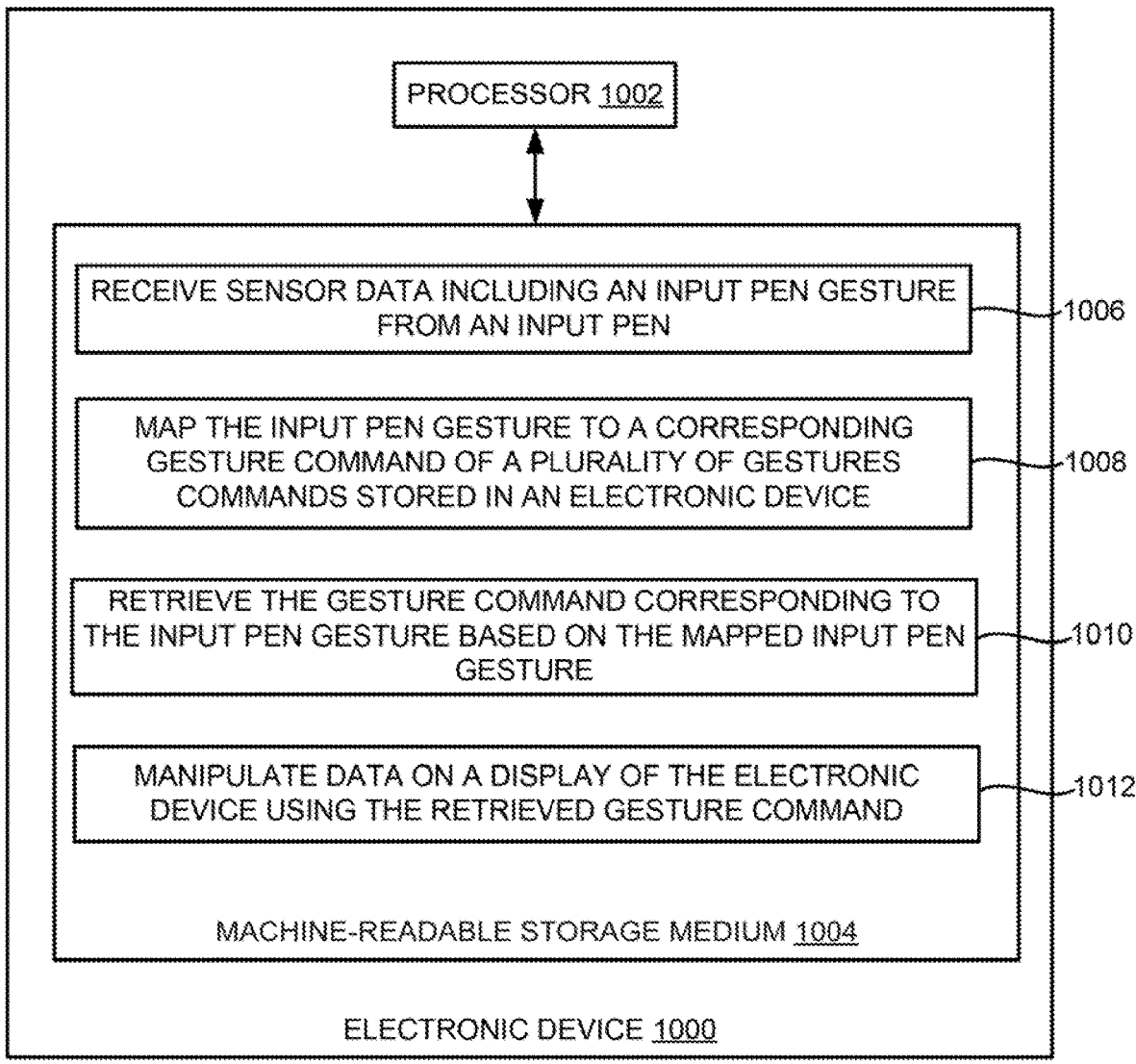
FIG. 10 illustrates a block diagram of an example electronic device to manipulate data on a display of the electronic device using input pen gestures.

FIG. 10 illustrates a block diagram of an example electronic device 1000 to manipulate data on a display of electronic device 1000 using input pen gestures. Electronic device 1000 may include a processor 1002 and a machine-readable storage medium 1004 communicatively coupled through a system bus. Processor 1002 may be any type of central processing unit (CPU), microprocessor, or processing logic that interprets and executes machine-readable instructions stored in machine-readable storage medium 1004. Machine-readable storage medium 1004 may be a random-access memory (RAM) or another type of dynamic storage device that may store information and machine-readable instructions that may be executed by processor 1002. For example, machine-readable storage medium 1004 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 1004 may be a non-transitory machine-readable medium. In an example, machine-readable storage medium 1004 may be remote but accessible to electronic device 1000.

Machine-readable storage medium 1004 may store instructions 1006-1012. In an example, instructions 1006-1012 may be executed by processor 1002 to provide a mechanism for performing input operations on a display of electronic device 1000 using input pen gestures. Instructions 1006 may be executed by processor 1002 to receive sensor data including an input pen gesture from an input pen. Instructions 1008 may be executed by processor 1002 to map the input pen gesture to a corresponding gesture command of a plurality of gestures commands stored in electronic device 1000. Instructions 1010 may be executed by processor 1002 to retrieve the gesture command corresponding to the input pen gesture based on the mapped input pen gesture. Instructions 1012 may be executed by processor 1002 to manipulate data on a display of electronic device 1000 using the retrieved gesture command.

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An input pen to control an operation of a display, comprising:
   a sensor to detect an input pen gesture;
   a communication interface to establish a connection with the display; and
   a controller to:
      transmit a control signal corresponding to the detected input pen gesture to the display via the communication interface, wherein the control signal is used to retrieve a gesture command to manipulate data on the display; and
      retrieve a multimedia streaming operation or a presentation slide operation in response to the detected input pen gesture comprising a movement of the input pen along an x, y, or z-axis with the input pen held horizontally.

2. The input pen of claim 1, wherein the sensor comprises an acceleration sensor, gyro sensor, or a combination thereof.

3. The input pen of claim 1, comprising:
   a trigger, wherein the sensor is activated by pressing and holding the trigger, and wherein the sensor is deactivated and the input pen is operated in a pen input mode when the trigger is released.

4. The input pen of claim 1, wherein the gesture command comprises an input operation selected from the group consisting of a shift operation along the x or y axis, a zoom operation, and a rotate operation, and wherein the input pen gesture comprises a movement of the input pen that corresponds with the input operation.

5. The input pen of claim 1, wherein the gesture command uniquely corresponds to the input pen gesture.

6. The input pen of claim 5, wherein the input pen gesture comprises a gesture in a horizontal mode or vertical mode, wherein the gesture in the vertical mode comprises a movement of the input pen along x, y, or z-axis or rotational movement of the input pen when holding the input pen vertically, and wherein the gesture in the horizontal mode comprises movement of the input pen along x, y, or z-axis when holding the input pen horizontally.

7. An electronic device comprising:
   a main body comprising:
      a display;
      a memory to store a plurality of gesture commands; and
      a processor; and
   an input pen detachably connected with the main body, wherein the input pen comprises:
      a sensor to detect an input pen gesture; and
      a controller to:
         transmit a control signal corresponding to the detected input pen gesture to the main body, wherein the processor is to retrieve a gesture command from the plurality of gesture commands based on the control signal to manipulate data on the display; and
         retrieve a rotate operation in response to the input pen gesture comprising a rotational movement of the input pen when the input pen is held vertically.

8. The electronic device of claim 7, wherein each of the gesture commands uniquely corresponds to a respective input pen gesture of a plurality of input pen gestures, and wherein each of the input pen gestures comprise a gesture in a horizontal mode or vertical mode, wherein the gesture in the vertical mode comprises a movement of the input pen along x, y, or z-axis, and wherein the gesture in the horizontal mode comprises movement of the input pen along x, y, or z-axis when holding the input pen horizontally.

9. The electronic device of claim 7, wherein the input pen comprises:
a trigger, wherein the sensor is activated upon pressing and holding the trigger and the sensor is deactivated and the input pen is operated in a pen input mode when the trigger is released.

10. The electronic device of claim 7, wherein each of the gesture commands comprises an input operation selected from the group consisting of a shift operation along the x or y axis, a zoom operation, a multimedia streaming operation, and a presentation slide operation, and wherein the input pen gesture comprises a movement of the input pen that corresponds with the input operation.

11. The electronic device of claim 7, wherein the controller is to transmit the control signal corresponding to the detected input pen gesture to the main body through a data exchange protocol, wherein the data exchange protocol comprises a Bluetooth.

12. A method comprising:
receiving sensor data including an input pen gesture from an input pen;
mapping the input pen gesture to a corresponding gesture command of a plurality of gestures commands stored in an electronic device;
retrieving the gesture command corresponding to the input pen gesture based on the mapped input pen gesture; and
manipulating data on a display of the electronic device using the retrieved gesture command,
wherein retrieving the gesture command corresponding to the input pen gesture comprises retrieving a shift operation along the x or y axis in response to the input pen gesture comprising a movement of the input pen along an x or y axis while the input pen is held vertically.

13. The method of claim 12, wherein the sensor is activated by pressing and holding a trigger provided in the input pen, and wherein the sensor is deactivated and the input pen is operated in a pen input mode when the trigger is released.

14. The method of claim 12, wherein retrieving the gesture command corresponding to the input pen gesture, comprises retrieving a zoom operation when the input pen gesture comprises a movement of the input pen along a z axis by holding the input pen vertically.

15. The method of claim 12, further comprising storing mapping information in a memory of the electronic device, wherein the mapping information comprises the plurality of gesture commands that are uniquely mapped to a plurality of input pen gestures, wherein the input pen gesture is mapped to the corresponding gesture command of the plurality of gestures commands based on the mapping information.

* * * * *